United States Patent
Han et al.

(10) Patent No.: US 11,095,764 B1
(45) Date of Patent: Aug. 17, 2021

(54) WIRELESS EARPHONE CAPABLE OF VOICE COMMUNICATION

(71) Applicant: SANGMYUNG UNIVERSITY INDUSTRY-ACADEMY COOPERATION FOUNDATION, Seoul (KR)

(72) Inventors: Bo Hyun Han, Seoul (KR); In Bok Kong, Seoul (KR)

(73) Assignee: SANGMYUNG UNIVERSITY INDUSTRY-ACADEMY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 17/123,049

(22) Filed: Dec. 15, 2020

(30) Foreign Application Priority Data

Feb. 18, 2020 (KR) .......................... 10-2020-0019970

(51) Int. Cl.
*H04M 1/60* (2006.01)
*H04B 5/06* (2006.01)
*H04M 1/738* (2006.01)
*H04M 1/253* (2006.01)

(52) U.S. Cl.
CPC ............ *H04M 1/6066* (2013.01); *H04B 5/06* (2013.01); *H04M 1/2535* (2013.01); *H04M 1/7385* (2013.01)

(58) Field of Classification Search
CPC ............. H04M 1/6066; H04M 1/2535; H04M 1/7385; H04B 5/06
See application file for complete search history.

(56) References Cited

U.S. PATENT DOCUMENTS 9,820,323 B1 * 11/2017 Young ..................... H04W 4/80
2016/0241947 A1 * 8/2016 Degraye .......... G10K 11/17857

* cited by examiner

*Primary Examiner* — Yuwen Pan
*Assistant Examiner* — Angelica M Perez
(74) *Attorney, Agent, or Firm* — Revolution IP, PLLC (57) ABSTRACT

A wireless earphone capable of voice communication includes a first wireless earphone 110 which is paired with a first mobile device 100 and performs transmission and reception, and a second wireless earphone 210 which is paired with a second mobile device 200 and performs transmission and reception, wherein the first mobile device and the first wireless earphone include a pairing unit for pairing the first mobile device and the first wireless earphone and a pairing unit 111 for the first wireless earphone 110, respectively, and the second wireless earphone includes a pairing unit 211 for pairing with the first wireless earphone.

4 Claims, 6 Drawing Sheets

WIRELESS EARPHONE CAPABLE OF VOICE COMMUNICATION

CROSS REFERENCE TO RELATED APPLICATION

This application is based on and claims priority under 35 U.S.C. 119 to Korean Patent Application No. 10-2020-0019970, filed on Feb. 18, 2020, in the Korean Intellectual Property Office, the disclosures of which is herein incorporated by reference in their entireties.

BACKGROUND OF THE INVENTION

1. Technical Field

The present disclosure relates to a wireless earphone capable of voice communication and, more particularly, to a wireless earphone capable of voice communication, wherein a first wireless earphone and a first mobile device are paired, a second wireless earphone and a second mobile device are paired, the first wireless earphone paired with the first mobile device and the second wireless earphone paired with the second mobile device are paired, and the first wireless earphone and the second wireless earphone convert voice signals into transmission signals and transmit and receive the transmission signals to and from each other without the intervention of the mobile devices.

2. Description of the Related Art

In general, a wireless earphone having a voice communication function is a mobile communication terminal that enables a phone call through a mobile device and a communication base station. However, in order to make a telephone call with a counterpart, the call needs to be performed within coverage. There is a problem in that a user cannot perform voice communication through a mobile device in a special place within an airplane in-flight or a specific area where the transmission and reception of radio waves with a communication base station are impossible.

In order to solve such inconvenience, there is a need for a wireless earphone which has a voice transmission and reception function through a conventional mobile device and can perform voice communication using a short-distance wireless communication function, such as Wi-Fi or Bluetooth.

SUMMARY OF THE INVENTION

Embodiment of the present disclosure provide a wireless earphone capable of voice communication, wherein a first wireless earphone and a first mobile device are paired, a second wireless earphone and a second mobile device are paired, the first wireless earphone paired with the first mobile device and the second wireless earphone paired with the second mobile device are paired, and the first wireless earphone and the second wireless earphone convert voice signals into transmission signals and transmit and receive the transmission signals to and from each other without the intervention of the mobile devices.

However, a technical object of the present disclosure is not limited to the aforementioned technical objects, and other technical objects not described above may be evidently understood by a person having ordinary skill in the art from the following description.

In an embodiment, in a wireless earphone paired with a mobile device and performing transmission and reception, a first mobile device 100 and a first wireless earphone 110 include a pairing unit for pairing the first mobile device 100 and the first wireless earphone 110 and a pairing unit 111 for the first wireless earphone 110, respectively. A second wireless earphone 210 includes a pairing unit 211 for pairing with the first wireless earphone 110. When the first wireless earphone 110 and the second wireless earphone 210 are present in a coverage area, the first wireless earphone 110 and the second wireless earphone 210 are paired without the intervention of the first mobile device 100 and the second mobile device 200, and perform a voice communication function using a wireless local area network.

Furthermore, the present disclosure relates to a wireless earphone capable of voice communication, wherein the pairing of the first mobile device and the first wireless earphone is completed in such a manner that the pairing unit of the first mobile device requests the pairing of the first mobile device and the first wireless earphone and the pairing unit of the first wireless earphone accepts the pairing request from the first mobile device. The pairing of the second mobile device and the second wireless earphone is completed in such a manner that the pairing unit of the second mobile device requests the pairing of the second mobile device and the second wireless earphone and the pairing unit of the second wireless earphone accepts the pairing request from the second mobile device. The pairing of the first wireless earphone paired with the first mobile device and the second wireless earphone paired with the second mobile device is completed in such a manner that the pairing unit of the first wireless earphone requests the pairing of the first wireless earphone and the second wireless earphone and the pairing unit of the second wireless earphone accepts the pairing request from the first wireless earphone. When the paired first wireless earphone and second wireless earphone are present in a coverage area, the first wireless earphone is automatically paired with the second wireless earphone.

Furthermore, the present disclosure relates to a wireless earphone capable of voice communication, wherein each of the first mobile device and the second mobile device includes an input unit for converting a sound wave into an analog signal; an analog-to-digital (AD) converter for converting the analog signal into a digital signal; an encoding converter for encoding the digital signal into a transmission signal; a compression unit for compressing one packet of the encoded transmission signal; a transmitter for transmitting the compressed transmission signal; a receiver for receiving a signal from a counterpart earphone; a decompression unit for decompressing the received transmission signal; a decoding converter for decoding the decompressed transmission signal into a digital signal; a digital-to-analog (DA) converter for converting, into an analog signal, the transmission signal converted into the digital signal; an output unit for converting, into a sound wave, the analog signal converted by the DA converter; a circuit board in which communication parts and communication circuits are configured; a microprocessor for controlling a series of processes including data transmission and reception and a conversion; a battery unit for supplying power; and an ID confirmation unit for confirming whether an ID signal included in the transmission signal is a paired ID signal.

Furthermore, the present disclosure relates to a wireless earphone capable of voice communication, wherein a key volume for adjusting the loudness of a voice may be selectively provided on one side of each of the first wireless earphone and the second wireless earphone.

Furthermore, the present disclosure relates to a wireless earphone capable of voice communication, wherein in the state in which the first wireless earphone 110 and the second wireless earphone 210 have been paired in a way to mutually transmit and receive voice signals, an input unit 112 of the first wireless earphone converts a sound wave into an analog signal, an AD converter 113 of the first wireless earphone converts the analog signal into a digital signal, an encoding converter 114 of the first wireless earphone encodes the digital signal into a transmission signal, a compression unit 115 of the first wireless earphone compresses one packet of the encoded transmission signal, a transmitter 116 of the first wireless earphone transmits the compressed transmission signal, a receiver 217 of the second wireless earphone receives the compressed transmission signal from the first earphone, a decompression unit 218 of the second wireless earphone decompresses the compressed transmission signal of the first wireless earphone, a decoding converter 219 of the second wireless earphone decodes the decompressed transmission signal of the first wireless earphone into a digital signal, a DA converter 240 of the second wireless earphone converts, into an analog signal, the transmission signal of the first wireless earphone converted into the digital signal, and an output unit 241 of the second wireless earphone converts, into a sound wave, the analog signal converted by the DA converter.

Furthermore, the present disclosure relates to a wireless earphone capable of voice communication, wherein in the step of converting, by the DA converter of the second wireless earphone, the decompressed transmission signal of the first wireless earphone into the digital signal, the ID confirmation unit of the second wireless earphone confirms whether an ID included in the transmission signal is an ID signal of the first wireless earphone.

Furthermore, the present disclosure relates to a wireless earphone capable of voice communication, wherein the transmission signal is composed of one packet, including a unique ID, a start signal, a voice signal converted into a digital signal, and an end signal. The transmission signal is transmitted using an eigen frequency for a given unit time, thereby enabling bidirectional transmission and reception.

Furthermore, the present disclosure relates to a wireless earphone capable of voice communication, wherein each of the first and second mobile devices paired with the first and second wireless earphones, respectively, includes a display unit 120 on which a password setting box is displayed, an app 130 installed in each mobile device to enable a given password to be set in the ID of each paired wireless earphone, and a password input unit 131 in which a password of each paired wireless earphone is set and input.

Furthermore, the present disclosure relates to a wireless earphone capable of voice communication, wherein the wireless earphone uses a local area network (LAN), such as Wi-Fi or Bluetooth. One mobile device may be paired with a plurality of wireless earphones.

Characteristics and advantages of the present disclosure will become more evident from the following detailed description with reference to the accompanying drawings.

Prior to the detailed description, terms or words used in the specification and the claims should not be construed as having common or dictionary meanings, but should be construed as having meanings and concepts that comply with the technical spirit of the present disclosure based on the principle that the inventor may appropriately define the concepts of the terms in order to describe his or her disclosure in the best manner.

DESCRIPTION OF REFERENCE NUMERALS

100: first mobile device
110: first wireless earphone
111: pairing unit of first wireless earphone
112: input unit of first wireless earphone
113: AD converter of first wireless earphone
114: encoding converter of first wireless earphone
115: compression unit of first wireless earphone
116: transmitter of first wireless earphone
120: display unit 130: app
131: password input unit 200: second mobile device
210: second wireless earphone
211: pairing unit of second wireless earphone
217: receiver of second wireless earphone
218: decompression unit of second wireless earphone
219: decoding converter of second wireless earphone
240: DA converter of second wireless earphone
241: output unit of second wireless earphone
250: circuit board 260: microprocessor
270: battery unit 300: third mobile device
310: third wireless earphone
400: fourth mobile device
410: fourth wireless earphone
500: communication base station

DETAILED DESCRIPTION

Hereinafter, embodiments of the present disclosure will be described with reference to the accompanying drawings through various exemplary embodiments. The thicknesses of lines or the sizes of elements in the drawings may have been exaggerated for the clarity of a description and for convenience' sake.

Furthermore, terms to be described below have been defined by taking into consideration their functions in the present disclosure, and may be different depending on a user or operator's intention or practice. Accordingly, such terms should be interpreted based on the overall contents of this specification.

Furthermore, the following embodiments are not intended to limit the scope of rights of the present disclosure, but are intended to illustrate elements proposed in the claims of the present disclosure. An embodiment including an element that is included in the technical spirit written in the specification of the present disclosure and that may be substituted with an element of the claims may be included in the scope of rights of the present disclosure.

Figure 1:
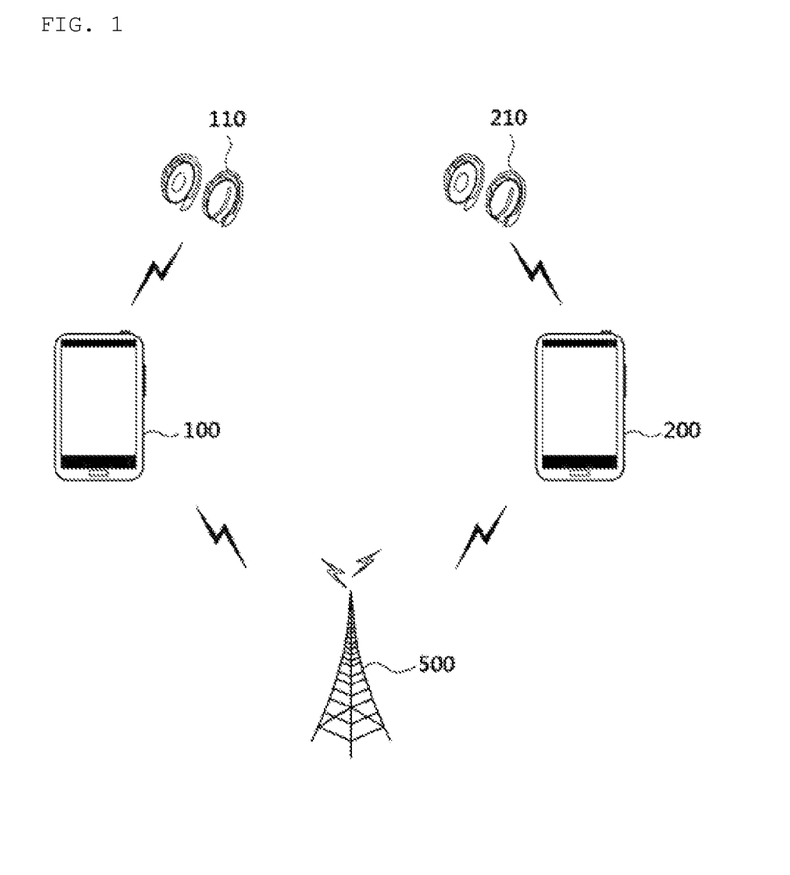
FIG. 1 illustrates a conventional technology.
Figure 2:
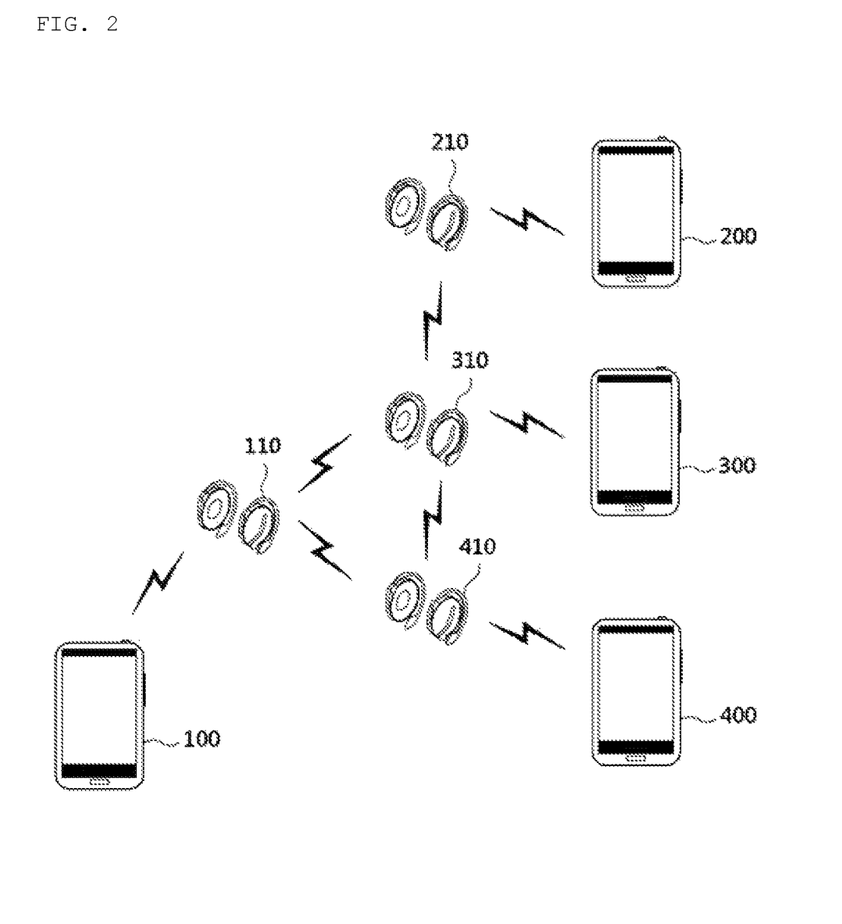
FIG. 2 illustrates a voice communication state according to an embodiment of the present disclosure.

FIG. 1 illustrates a conventional technology. Conventionally, a first wireless earphone 110 is paired with a first mobile device 100. A second wireless earphone 210 is paired with a second mobile device 200. The first mobile device and the second mobile device can perform voice communication with a counterpart mobile device through a communication base station 500. However, such a voice communication function has a problem in that voice communication is impossible out of coverage of the communication base station. In order to solve such inconvenience, according to an embodiment of the present disclosure, a wireless earphone communicating with a conventional mobile device can perform voice transmission and reception with another wireless earphone using a short-distance wireless communication function through pairing with the another wireless earphone without the intervention of a mobile device.

Figure 4:
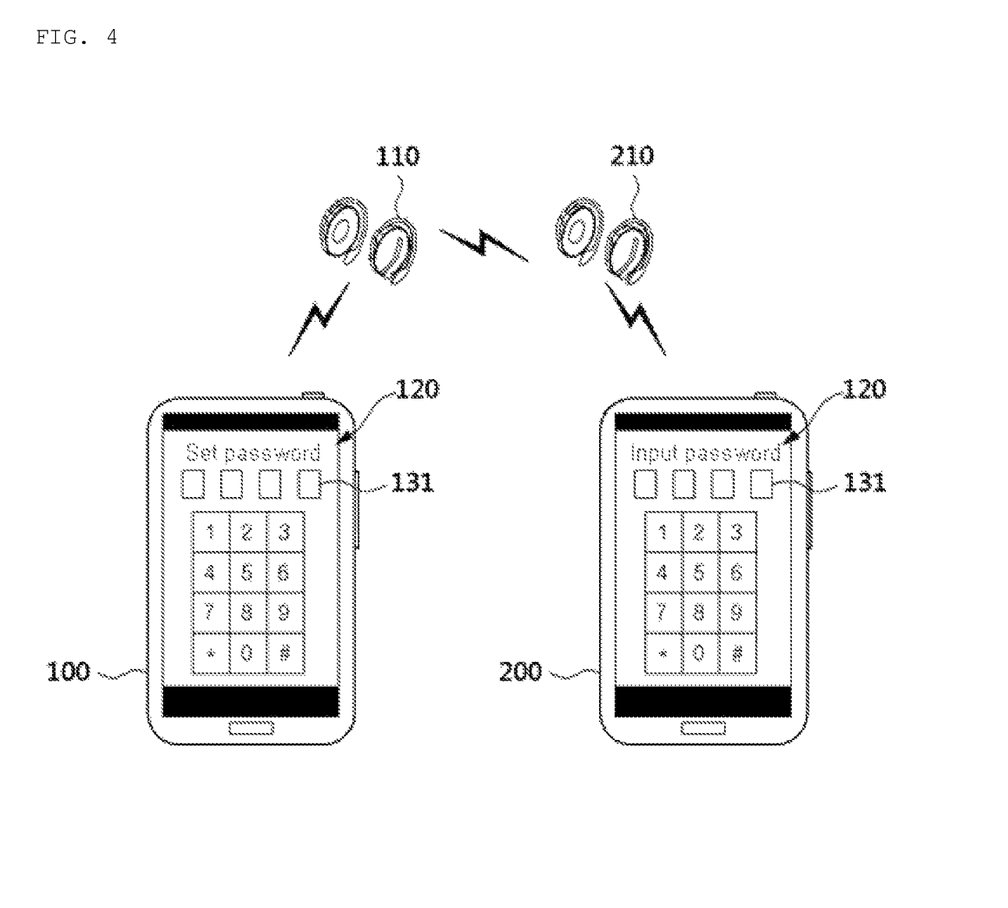
FIG. 4 illustrates a state of mobile devices according to an embodiment of the present disclosure.

FIG. 4 illustrates a state of mobile devices according to an embodiment of the present disclosure.

In the first wireless earphone 110 paired with the first mobile device 100 and configured to perform transmission and reception and the second wireless earphone 210 paired with the second mobile device 200 and configured to perform transmission and reception, the first mobile device 100 and the first wireless earphone 110 include a pairing unit for pairing the first mobile device 100 and the first wireless earphone 110 and a pairing unit 111 for the first wireless earphone 110, respectively. The second wireless earphone 210 includes a pairing unit 211 for pairing with the first wireless earphone 110. When the first wireless earphone 110 and the second wireless earphone 210 are present within a coverage area, the first wireless earphone 110 and the second wireless earphone 210 are paired without the intervention of the first mobile device 100 and the second mobile device 200, and perform a voice communication function using a wireless local area network (WLAN).

Figure 5:
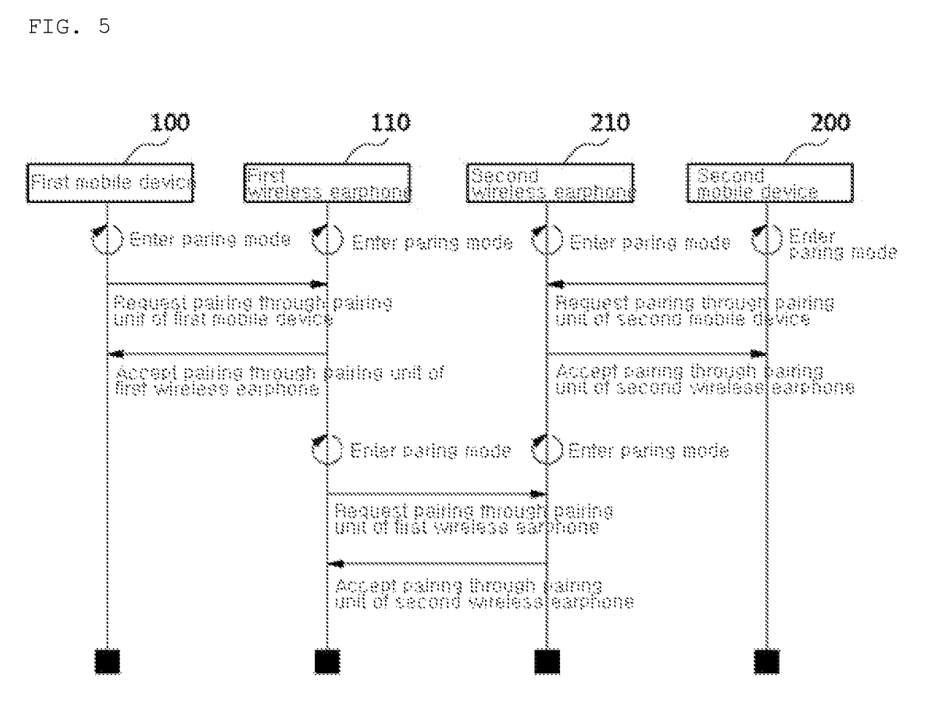
FIG. 5 illustrates a pairing process according to an embodiment of the present disclosure.

Furthermore, FIG. 5 illustrates a pairing process according to an embodiment of the present disclosure.

The pairing of the first mobile device 100 and the first wireless earphone 110 is completed in such a manner that the pairing unit of the first mobile device 100 requests the pairing of the first mobile device 100 and the first wireless earphone 110 and the pairing unit of the first wireless earphone 110 accepts the pairing request from the first mobile device 100. The pairing of the second mobile device 200 and the second wireless earphone 210 is completed in such a manner that the pairing unit of the second mobile device 200 requests the pairing of the second mobile device 200 and the second wireless earphone 210 and the pairing unit of the second wireless earphone 210 accepts the pairing request from the second mobile device 200. The pairing of the first wireless earphone 110 paired with the first mobile device 100 and the second wireless earphone 210 paired with the second mobile device 200 is completed in such a manner that the pairing unit of the first wireless earphone 110 requests the pairing of the first wireless earphone 110 and the second wireless earphone 210 and the pairing unit of the second wireless earphone 210 accepts the pairing request from the first wireless earphone. When the paired first wireless earphone and second wireless earphone are present in a coverage area, the first wireless earphone is automatically paired with the second wireless earphone.

Figure 3:
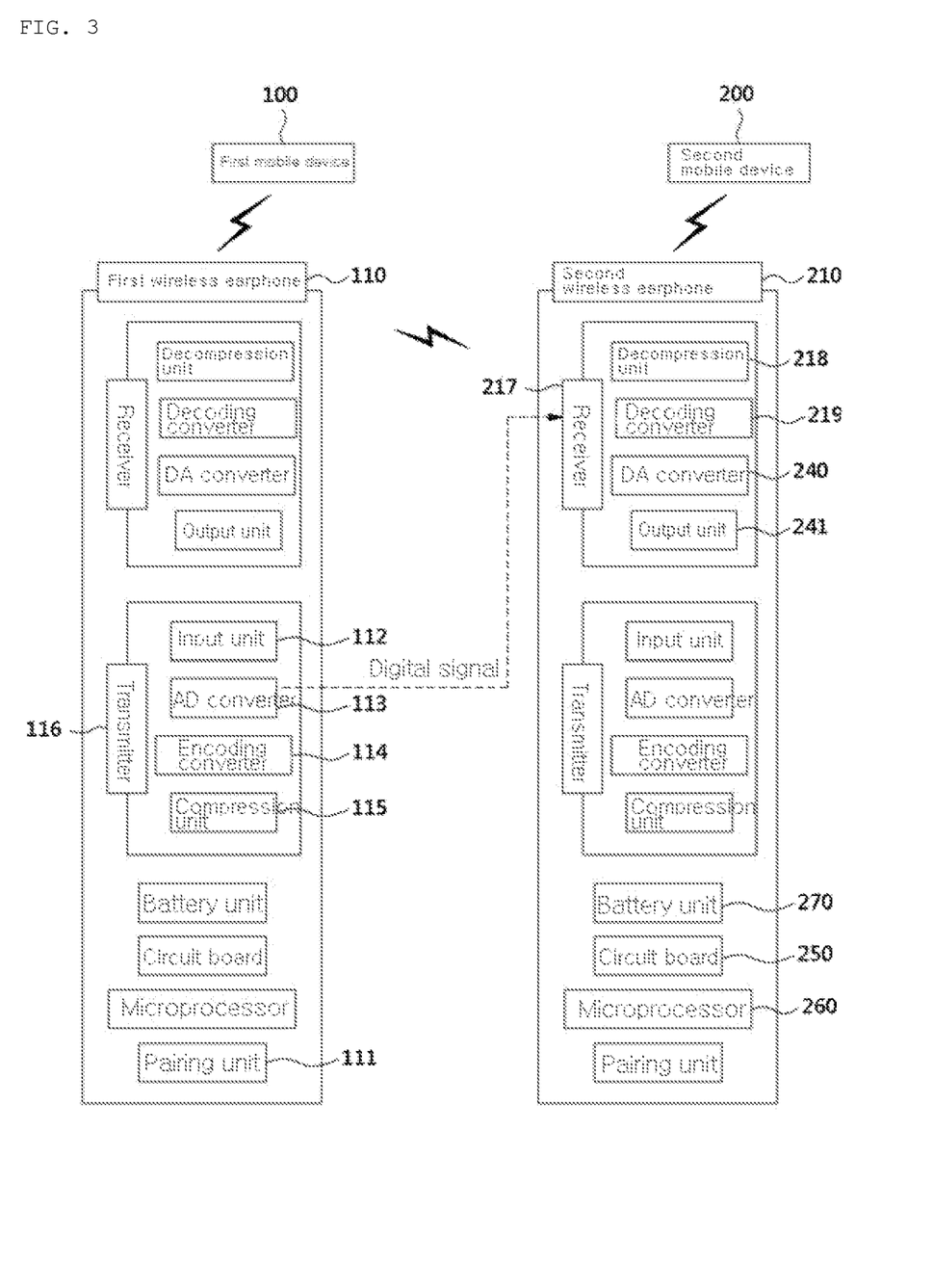
FIG. 3 illustrates configurations of a first wireless earphone and a second wireless earphone according to an embodiment of the present disclosure.

FIG. 3 illustrates configurations of the first wireless earphone and the second wireless earphone according to an embodiment of the present disclosure.

Each of the first wireless earphone 110 and the second wireless earphone 210 includes an input unit for converting a sound wave into an analog signal, an analog-to-digital (AD) converter for converting the analog signal into a digital signal, an encoding converter for encoding the digital signal into a transmission signal, a compression unit for compressing one packet of the encoded transmission signal, a transmitter for transmitting the compressed transmission signal, a receiver for receiving a signal from a counterpart earphone, a decompression unit for decompressing the received transmission signal, a decoding converter for decoding the decompressed transmission signal into a digital signal, a digital-to-analog (DA) converter for converting, into an analog signal, the transmission signal converted into the digital signal, an output unit for converting, into a sound wave, the analog signal converted by the DA converter, a circuit board in which communication parts and communication circuits are configured, a microprocessor for controlling a series of processes including data transmission and reception and a conversion, a battery unit for supplying power, and an ID confirmation unit for confirming whether an ID signal included in the transmission signal is a paired ID signal.

Furthermore, according to an embodiment of the present disclosure, a key volume for adjusting the loudness of a voice may be selectively provided on one side of each of the first wireless earphone and the second wireless earphone.

Figure 6:
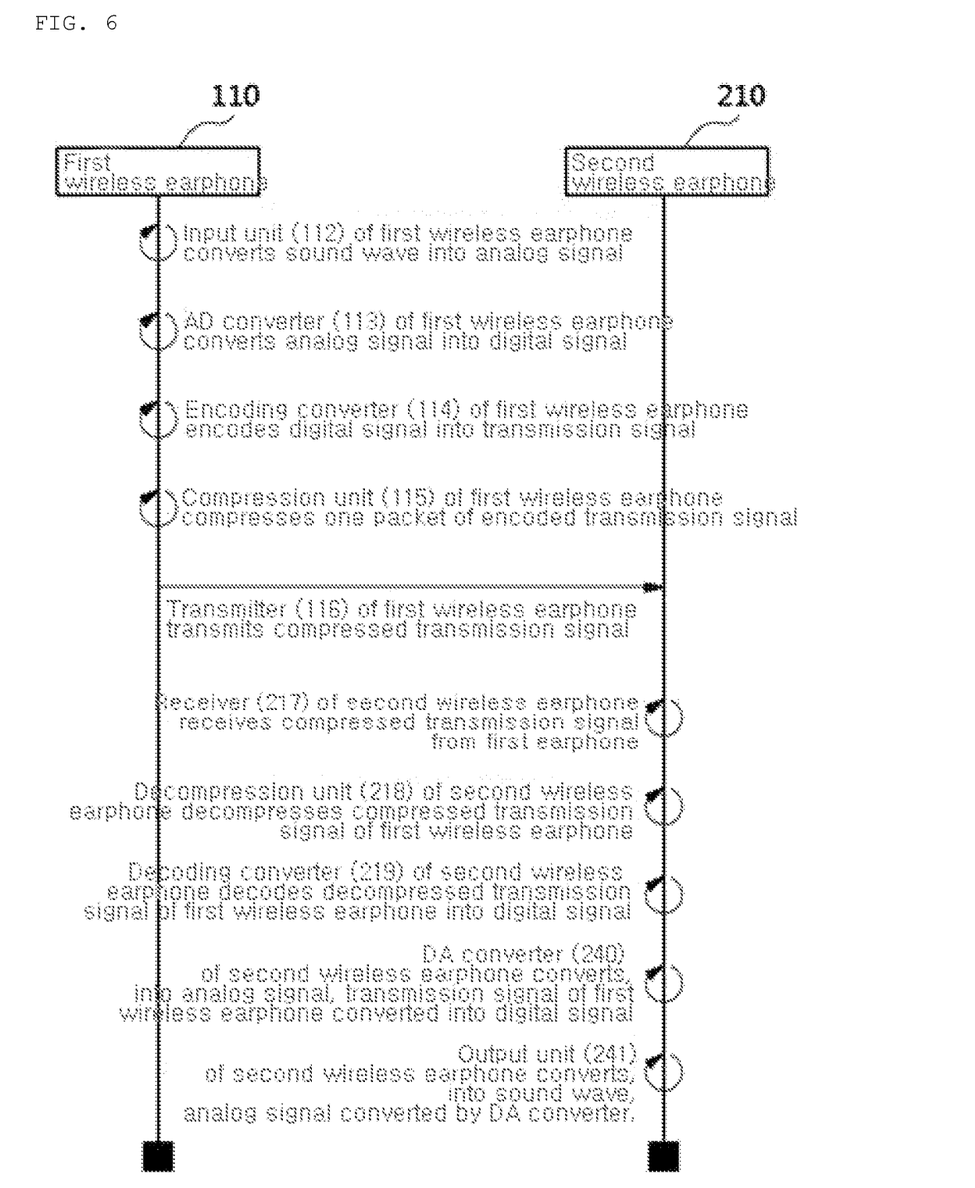
FIG. 6 illustrates a voice communication process of the first wireless earphone and the second wireless earphone according to an embodiment of the present disclosure.

FIG. 6 illustrates a voice communication process of the first wireless earphone and the second wireless earphone according to an embodiment of the present disclosure.

In the state in which the first wireless earphone 110 and the second wireless earphone 210 have been paired in a way to mutually transmit and receive voice signals, the input unit 112 of the first wireless earphone converts a sound wave into an analog signal. The AD converter 113 of the first wireless earphone converts the analog signal into a digital signal. The encoding converter 114 of the first wireless earphone encodes the digital signal into a transmission signal. The compression unit 115 of the first wireless earphone compresses one packet of the encoded transmission signal. The transmitter 116 of the first wireless earphone transmits the compressed transmission signal. In response thereto, the receiver 217 of the second wireless earphone receives the compressed transmission signal from the first earphone. The decompression unit 218 of the second wireless earphone decompresses the compressed transmission signal of the first wireless earphone. The decoding converter 219 of the second wireless earphone decodes the decompressed transmission signal of the first wireless earphone into a digital signal. The DA converter 240 of the second wireless earphone converts, into an analog signal, the transmission signal of the first wireless earphone converted into the digital signal. The output unit 241 of the second wireless earphone converts, into a sound wave, the analog signal converted by the DA converter.

More specifically, in the step of converting, by the DA converter of the second wireless earphone, the decompressed transmission signal of the first wireless earphone into the digital signal, the ID confirmation unit of the second wireless earphone confirms whether an ID included in the transmission signal is an ID signal of the first wireless earphone.

Furthermore, according to an embodiment of the present disclosure, the transmission signal is composed of one packet, including a unique ID, a start signal, a voice signal converted into a digital signal, and an end signal. The transmission signal is transmitted using an eigen frequency for a given unit time, thereby enabling bidirectional transmission and reception. Furthermore, according to an embodiment of the present disclosure, each of the first and second mobile devices paired with the first and second wireless earphones, respectively, includes a display unit 120 on which a password setting box is displayed, an app 130 installed in each mobile device to enable a given password to be set in the ID of each paired wireless earphone, and a password input unit 131 in which a password of each paired wireless earphone is set and input.

Furthermore, the wireless earphone according to an embodiment of the present disclosure uses a local area network (LAN), such as Wi-Fi or Bluetooth. One mobile device may be paired with a plurality of wireless earphones.

As described above, according to the present disclosure, there is an effect in that the first wireless earphone and the second wireless earphone can transmit and receive voice signals through pairing without the intervention of the first mobile device and the second mobile device.

Furthermore, a password can be set in the wireless earphone paired with the mobile device because the app through which a given password can be set in the ID of the wireless earphone paired with the mobile device is installed in the mobile device. Accordingly, there is an effect in that when another wireless earphone requests pairing with the wireless earphone in which the password has been set, the another wireless earphone can be paired with a specific device by inputting the password of the wireless earphone in which the password has been set.

The detailed embodiments of the present disclosure have been described above, but merely illustrate embodiments of the present disclosure. It is evident that the present disclosure is not limited to the detailed embodiments and may be modified or improved by a person having ordinary knowledge in the art within the technical spirit of the present disclosure.

A simple modification or change of the present disclosure belongs to the category of the present disclosure, and a detailed scope of protection of the present disclosure will become evident by the claims.

What is claimed is:

1. A wireless earphone capable of voice communication, wherein a first wireless earphone (110) is paired with a first mobile device (100) and performs transmission and reception, and a second wireless earphone (210) is paired with a second mobile device (200) and performs transmission and reception, the first mobile device (100) and the first wireless earphone (110) comprise a pairing unit configured and executed by a processor for pairing the first mobile device (100) and the first wireless earphone (110) and a pairing unit (111) configured and executed by the processor for the first wireless earphone (110), respectively, the second wireless earphone (210) comprises a pairing unit (211) configured and executed by the processor for pairing with the first wireless earphone (110), and when the first wireless earphone (110) and the second wireless earphone (210) are present in a coverage area, the first wireless earphone (110) and the second wireless earphone (210) are paired without the intervention of the first mobile device (100) and the second mobile device (200), and perform a voice communication function using a wireless local area network, wherein in a state in which the first wireless earphone (110) and the second wireless earphone (210) have been paired in a way to mutually transmit and receive voice signals, an input unit (112) of the first wireless earphone converts a sound wave into an analog signal, the input unit being configured and executed by the processor, an AD converter (113) of the first wireless earphone converts the analog signal into a digital signal, an encoding converter (114) of the first wireless earphone encodes the digital signal into a transmission signal, wherein the transmission signal is composed of one packet including a unique ID, a start signal, a voice signal converted into a digital signal, and an end signal, the transmission signal transmitted using an eigen frequency for a given unit time, thereby enabling bidirectional transmission and reception, a compression unit (115) of the first wireless earphone compresses one packet of the encoded transmission signal, the compression unit being configured and executed by the processor, a transmitter (116) of the first wireless earphone transmits the compressed transmission signal, a receiver (217) of the second wireless earphone receives the compressed transmission signal from the first earphone, a decompression unit (218) of the second wireless earphone decompresses the compressed transmission signal of the first wireless earphone, the decompression unit being configured and executed by the processor, a decoding converter (219) of the second wireless earphone decodes the decompressed transmission signal of the first wireless earphone into a digital signal, an ID confirmation unit of the second wireless earphone confirms whether an ID included in the transmission signal is an ID signal of the first wireless earphone, the ID confirmation unit being configured and executed by the processor, a DA converter (240) of the second wireless earphone converts, into an analog signal, the transmission signal of the first wireless earphone converted into the digital signal, an output unit (241) of the second wireless earphone converts, into a sound wave, the analog signal converted by the DA converter, the output unit being configured and executed by the processor, and each of the first and second mobile devices paired with the first and second wireless earphones, respectively, includes a display (120) on which a password setting box is displayed, an app (130) installed in each mobile device to enable a given password to be set in the ID of each paired wireless earphone, and a password input unit (131) in which a password of each paired wireless earphone is set and input, the password input unit being configured and executed by the processor.

2. The wireless earphone of claim 1, wherein:

the pairing of the first mobile device and the first wireless earphone is completed in such a manner that the pairing unit of the first mobile device requests the pairing of the first mobile device and the first wireless earphone and the pairing unit of the first wireless earphone accepts the pairing request from the first mobile device, the pairing of the second mobile device and the second wireless earphone is completed in such a manner that the pairing unit of the second mobile device requests the pairing of the second mobile device and the second wireless earphone and the pairing unit of the second wireless earphone accepts the pairing request from the second mobile device, the pairing of the first wireless earphone paired with the first mobile device and the second wireless earphone paired with the second mobile device is completed in such a manner that the pairing unit of the first wireless earphone requests the pairing of the first wireless earphone and the second wireless earphone and the pairing unit of the second wireless earphone accepts the pairing request from the first wireless earphone, and when the paired first wireless earphone and second wireless earphone are present in a coverage area, the first wireless earphone is automatically paired with the second wireless earphone.

3. The wireless earphone of claim 2, wherein each of the first mobile device and the second mobile device comprises:

an input unit configured and executed by the processor for converting a sound wave into an analog signal;

an analog-to-digital (AD) converter for converting the analog signal into a digital signal;

an encoding converter for encoding the digital signal into a transmission signal;

a compression unit configured and executed by the processor for compressing one packet of the encoded transmission signal;

a transmitter for transmitting the compressed transmission signal;

a receiver for receiving a signal from a counterpart earphone;

a decompression unit configured and executed by the processor for decompressing the received transmission signal;

a decoding converter for decoding the decompressed transmission signal into a digital signal;

a digital-to-analog (DA) converter for converting, into an analog signal, the transmission signal converted into the digital signal;

an output unit configured and executed by the processor for converting, into a sound wave, the analog signal converted by the DA converter;

a circuit board in which communication parts and communication circuits are configured;

a microprocessor for controlling a series of processes including data transmission and reception and a conversion;

a battery for supplying power; and an ID confirmation unit configured and executed by the processor for confirming whether an ID signal included in the transmission signal is a paired ID signal.

4. The wireless earphone of claim 3, wherein a key volume for adjusting a loudness of a voice is selectively provided on one side of each of the first wireless earphone and the second wireless earphone.

* * * * *